US012759378B2

(12) United States Patent
Wu

(10) Patent No.: US 12,759,378 B2
(45) Date of Patent: Oct. 13, 2026

(54) FUNCTIONAL STRUCTURES FOR A RETRACTABLE CARRIAGE COVER

(71) Applicant: Hongbo Wu, Ningbo (CN)

(72) Inventor: Hongbo Wu, Ningbo (CN)

(73) Assignee: Hongbo Wu, Ningbo (CN)

( * ) Notice: Subject to any disclaimer, the term of this patent is extended or adjusted under 35 U.S.C. 154(b) by 349 days.

(21) Appl. No.: 18/483,691

(22) Filed: Oct. 10, 2023

(65) Prior Publication Data

US 2024/0217322 A1 Jul. 4, 2024

(51) Int. Cl.
*B60J 7/14* (2006.01)

(52) U.S. Cl.
CPC .................................... *B60J 7/141* (2013.01)

(58) Field of Classification Search
CPC ... B60J 7/141; B60J 7/145; B60J 7/148; B60J 7/1855; B60J 7/196; B60J 7/198
USPC .................................................... 296/100.09
See application file for complete search history.

(56) References Cited

U.S. PATENT DOCUMENTS 841,072 A * 1/1907 Trout ..................... B60J 7/1855 296/129
4,520,546 A * 6/1985 Darnell ................. F16C 11/069 403/56
5,087,093 A * 2/1992 Repetti .................... B60J 7/141 296/100.09
6,623,062 B1 * 9/2003 Hoffman ................ B60J 7/1621 296/100.1
6,899,372 B1 * 5/2005 Keller ...................... B60J 7/141 296/100.1
7,021,693 B2 * 4/2006 Keller ...................... B60J 7/141 296/100.1
8,960,765 B2 * 2/2015 Facchinello ............. B60J 7/141 296/100.09
9,004,571 B1 * 4/2015 Bernardo ................. B60J 7/141 296/100.09
9,482,039 B1 * 11/2016 Xu .......................... E05D 3/125
11,299,021 B2 * 4/2022 Dylewski ................. B60J 7/198
11,673,459 B2 * 6/2023 Dylewski ............... B60J 7/1607 296/100.09
11,718,166 B2 * 8/2023 Dylewski ................. B60J 7/141 296/100.07
12,065,026 B2 * 8/2024 Dylewski ................. B60J 7/198
12,187,108 B2 * 1/2025 Facchinello ........... B60J 7/1607
12,485,737 B2 * 12/2025 Schmeichel ............. B60J 7/198
2006/0012211 A1 * 1/2006 Keller ...................... B60J 7/141 296/100.09
2007/0253765 A1 * 11/2007 Knopp ................ F16C 11/0638 403/122

(Continued)

*Primary Examiner* — Amy R Weisberg
(74) *Attorney, Agent, or Firm* — Quarles & Brady LLP

(57) ABSTRACT

The present invention discloses a retractable carriage cover assembly. The cover assembly comprising a frame. The cover assembly also comprises multiple panels assembled in the frame with each panel being coupled by a hinge component to its neighboring panel to either be laid flat in an expanded state in the frame or folded up one by one to a standing state relative to the frame. The cover assembly comprises a supportive component coupled to both the frame and at least one of the multiple panels folded in the standing state to maintain the standing state and one or more binding component and protective component to secure the panels in the standing state.

19 Claims, 9 Drawing Sheets

(56) References Cited

U.S. PATENT DOCUMENTS

2023/0158871 A1 * 5/2023 Rossi ....................... B60J 7/141
296/100.09

* cited by examiner

FUNCTIONAL STRUCTURES FOR A RETRACTABLE CARRIAGE COVER

CROSS-REFERENCES TO RELATED APPLICATIONS

The present application claims priority to China Patent Application No. 202223605039.5, filed Dec. 31, 2022, and China Patent Application No. 202223613531.7, filed Dec. 31, 2022, and China Patent Application No. 202223605017.9, filed Dec. 31, 2022, which are common owned and incorporated by reference herein for all purposes.

BACKGROUND OF THE INVENTION

The present invention relates to the technical field of vehicle carriage equipment, specifically, functional structures for a retractable carriage cover.

Currently, car models with open carriages require a cover assembly to be installed on the cargo beds, preventing them from getting wet in the rain. Some cover assemblies may be designed with multiple panels including a fixed panel plus at least two foldable panels. The foldable panels being hinged together and folded to open the carriage or deployed flat in a covering state. However, they cannot be maintained an independent vertical standing position. One side may be supported by a support rod, while the other side needs to rest against the back wall of the cargo bed. The back walls of the cargo beds are mostly made of hard materials like metal or plastic. Therefore, when the cover panels come into contact with the back wall, they exert forces on each other, making it extremely easy for the surfaces to become scratched or for dents and deformities to occur. Furthermore, once the cover panels rest against the back wall of the cargo bed, it will inevitably block part or all of the rearview of driver, thereby posing a safety hazard. Improved design of the cover assembly with retractable panels and multiple supportive and protective structures is desired.

BRIEF SUMMARY OF THE INVENTION

The present invention is directed to a vehicle carriage cover assembly with some supportive functional components. In a specific embodiment, the cover assembly includes multiple panels assembled in the frame with each panel being coupled by a hinge component to its neighboring panel. The multiple panels are configured to be either laid flat in an expanded state in the frame or folded up one by one to a standing state relative to the frame. The cover assembly also includes several functional components for supporting and protecting the multiple panels in the standing state. There are other embodiments as well.

One general aspect of the present disclosure includes a retractable carriage cover assembly. The cover assembly also includes a frame. The cover assembly also includes multiple panels assembled in the frame with each panel being coupled by a hinge component to its neighboring panel to either be laid flat in an expanded state in the frame or folded up one by one to a standing state relative to the frame. The cover assembly also includes a supportive component coupled to both the frame and at least one of the multiple panels folded in the standing state to maintain the standing state.

Implementations may include one or more of the following features. The cover assembly where the supportive component may include a first base plate fixed to the frame with a first side-connector protruding laterally from carriage outside inwards, the first side-connector may include a base segment fixed to the first base plate, a tapered segment extended from the base segment, and a ball-head segment further extended from the tapered segment. The supportive component further may include a second base plate fixed to the at least one of the multiple panels with a second side-connector protruding laterally from carriage inside outwards, the second side-connector may include a base segment, a tapered segment, and a ball-head segment. The supportive component further may include a rod member of a length from a first end segment with a first receiving cavity and a second end segment with a second receiving cavity, the length being configured to have the first receiving cavity to secure the ball-head segment of the first side-connector in a detachable connection between the first end segment of the rod member and the frame and the second receiving cavity to secure the ball-segment of the second side-connector to form a detachable connection between the second end segment of the rod member and the at least one of the multiple panels such that the at least one of the multiple panels maintains the standing state. The first receiving cavity may include an end opening to allow exit or entry of the ball-head segment of the first side-connector, a relief opening positioned relative to the tapered segment of the first side-connector, and an end cap to cover the end opening. The side-clearance opening may include a lateral dimension smaller than a diameter of the ball-head segment but larger than a smallest diameter of the tapered segment. The frame may include a retracking hook configured to hold the first end segment of the rod member after the first end segment being detached from the first side-connector for the multiple panels being laid flat in the expanded state.

Implementations may also include one or more of the following features. The latch may include a lock case may include an inner cavity with an open end and a stop end, the inner cavity matching outer contour of the latch for facilitating sliding motion of the latch between the locking state and the unlocking state. The latch may include a locking end to stretch out of the open end of the lock case in the locking state to limit the cover panel to the carriage side frame and retract fully into the lock case in the unlocking state to allow the cover panel being flipped up. The locking end may include a guiding surface configured to be pressed against the carriage side frame to push the locking end back to the lock case as the cover panel is being deployed, the locking end stretching out of the lock case again by a resetting force from the spring after the cover panel is fully laid flat on the carriage side frame. The latch may include a movable part connected to the locking end, the movable part being sleeved by a spring that abuts against the locking end and the stop end, the movable part pushing the locking end out of the open end of the lock case by a resetting force of the spring and pulling the locking end back in the lock case by compressing the spring. The latch may include a connecting end located outside of the lock case, the connecting end being prevented from moving towards the open end of the lock case by the stop end in the locking state and being configured to retract the locking end back to the lock case in the unlocking state. The locking structure may include a connector connecting the connecting end to the sliding plate to provide a pulling force to retract the locking end as the gear is rotated to cause a linear motion of the sliding plate.

Another general aspect of the present disclosure includes a retractable carriage cover assembly with a binding feature. The retractable carriage cover assembly also includes a frame. The cover assembly also includes multiple panels assembled in the frame with each panel being coupled by a hinge component to its neighboring panel to either be laid flat in an expanded state in the frame or folded up one by one to a standing state relative to the frame. The cover assembly also includes a supportive component coupled to both the frame and at least one of the multiple panels folded in the standing state to maintain the standing state. The cover assembly also includes a binding component configured to bundle the multiple panels folded together in the standing state.

Implementations may include one or more of the following features. The cover assembly where the binding component may include a fixing base fixed at one of the multiple panels, a strap member with a fixing end coupled via a strap groove to the fixing base and a binding end coupled via an adjusting groove to a buckle, and a first buckle seat disposed at another one of the multiple panels, the first buckle seat being configured to allow the buckle to snap in and be restrained when the cover assembly in the standing state. The first buckle seat may include an anti-detachment groove and the buckle may include an elastic clamp block, the anti-detachment groove being offset from a snapping-in direction of the buckle to lock the elastic clamp block in the first buckle seat. The strap member may include a soft elastic material configured to adjust a working length through the adjusting groove such that the strap member with the working length suited for wrapping across edges of the multiple panels folded together in the standing state to snap the buckle into the first buckle seat. The binding component further may include a second buckle seat disposed at the same one of the multiple panels as that with the fixing base, the second buckle seat being configured to allow the buckle to snap in and be restrained when the cover assembly in the expanded state. The supportive component may include a rod seat fixed to a mounting base that is disposed to the at least one of the multiple panels and a base plate mounted on the frame. The supportive component further may include a rod member of a length from a first end segment to a second end segment, the first end segment being configured to be inserted to the rod seat and the second end segment being coupled to the base plate that is fixed to a position on the frame to accommodate the length such that the multiple panels are maintained in the standing state.

Yet another general aspect of the present disclosure provides a retractable carriage cover assembly with a protective feature. The retractable carriage cover assembly also includes a frame with a flat end portion. The cover assembly also includes multiple panels assembled in the frame with each panel being coupled by a hinge component to its neighboring panel to either be laid flat in an expanded state in the frame or folded up one by one to a standing state rested on the flat end portion. The cover assembly also includes a supportive component coupled to both the frame and at least one of the multiple panels folded in the standing state to maintain the standing state. The cover assembly also includes a pair of protective components disposed next to the hinge component to form a protection buffer between the multiple panels folded in the standing state and the flat end portion of the frame.

Implementations may also include one or more of the following features. The cover assembly where each of the multiple panels may include a rigid frame member in a rectangular shape and a shield member of the rectangular shape placed over the rigid frame member. The rigid frame member of each panel may include a connection fixture extended outward, the connection fixture may include an installing groove with a necking rib and a connecting groove with a connection rib being set vertically relative to the shield member and a shaping rib being leveled with the shield member. Each of the pair of protective components may include a material made from one of rubber, soft plastic, and foam in a stripe shape may include an in-groove part and an out-groove part connected by a fitting groove, the in-groove part being inserted in the installing groove with the necking rib being fitted the fitting groove. The out-groove part of each of the pair of protective components may include a flat surface configured to touch the flat end portion of the frame for protecting at least two panels folded in the standing state or for touching against another flat surface corresponding to the another of the pair of protective components inserted in an installing groove of a connection fixture associated with a neighboring panel when both panels are in the expanded state. The hinge component may include a rubber material in a stripe shape configured with two connection parts be respectively inserted in two connecting grooves associated with respective two connection fixtures of two neighboring panels, the two connection parts being partially fixed by respective connection ribs and deformably restrained by the two shaping ribs.

It is to be appreciated that embodiments of the present invention provide many advantages over conventional techniques. Among other things, when multiple panels are in the standing state, a supportive component with one end coupled to at least one panel and the other end coupled to a movable mounting base at the carriage frame to maintain the multiple panels in the standing state. At least one end that is coupled to the carriage frame can be uncoupled from easily to allow the folded panels to be released flat back to an expanded state in the frame for covering the carriage. A binding component additionally can wrap (at least partially) the folded panels in the standing state to bind them together for securing their position in the standing state. Further, a protective component, which comprises a material made from one of rubber, soft plastic, and foam in a stripe shape, can be installed to a fixture along each coupling edge of two neighboring panels and configured to include a flat surface located outside the fixture to prevent the panels when they are folded in the standing state from directly touching against the frame, thus providing a soft buffer against direct impact or friction damages to either the panels or the frame.

The present invention achieves these benefits and others in the context of known technology. However, a further understanding of the nature and advantages of the present invention may be realized by reference to the latter portions of the specification and attached drawings.

Figure 1:
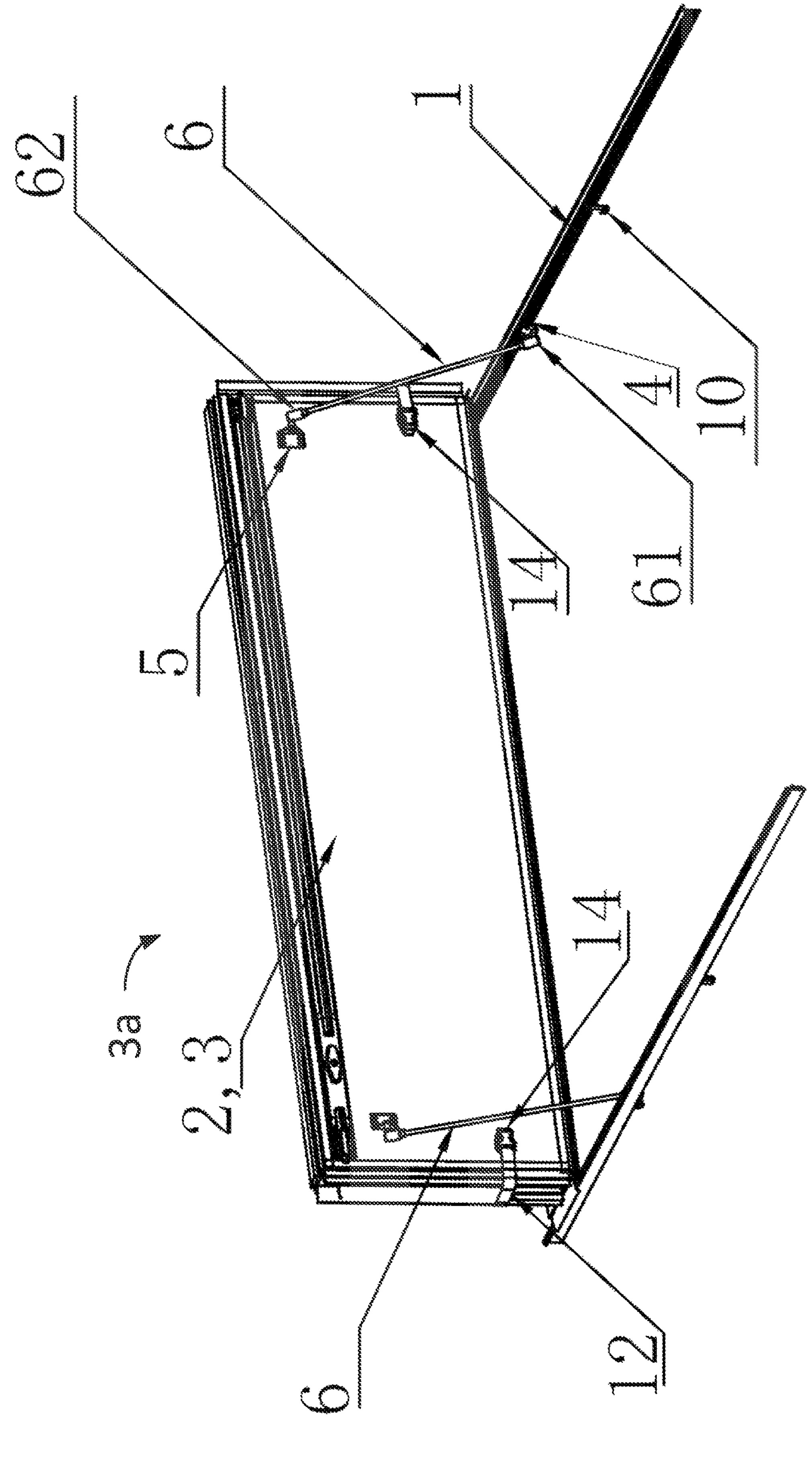
FIG. 1 is a perspective view of multiple panels folded to a standing state maintained by a supportive component according to an embodiment of the present invention.

Numerical indicators for components in Figures above:

1, Frame; 1*a*, Flat end portion of the frame; 2, Cover panel; 3, Cover assembly; 3*a*, Standing state; 3*b*, Expanded state; 4, First base plate; 5, Second base plate; 6, Rod member; 7, Side-connector; 8, Receiving cavity; 9, Screw; 10, Hook member; 11, Protective component; 11*a*, Flat surface; 11*b*, Arc surface; 11*c*, Fitting groove; 12, Strap member; 12*a*, Binding end; 12*b*, Fixing end; 13, Buckle; 14, First buckle seat; 15, Second buckle seat; 16, Anti-detachment groove; 17, Elastic clamp block; 18, Adjustment groove; 19*a*, Working section; 19*b*, Non-working section; 20, Fixing seat; 20*a*, Strap groove; 21, Connection fixture; 22, Installing groove; 24, Necking rib; 25, Hinge component; 26, Connecting groove; 28, Shaping rib; 29, 30, Positioning trench; Connection rib; 36, Rigid frame member; 37, Shield member; First 61, First end segment; 62, Second end segment; 71, Base segment; 72, Ball-head segment; 73, Tapered segment; 81, End opening; 82, Relief opening; 83, End cap; L, Lateral dimensions; D1, Diameter of the ball-head segment; D2, Diameter at the narrowest point of the tapered segment.

DETAILED DESCRIPTION OF THE INVENTION

The present invention is directed to a vehicle carriage cover assembly with some supportive functional components. In a specific embodiment, the cover assembly includes multiple panels assembled in the frame with each panel being coupled by a hinge component to its neighboring panel. The multiple panels are configured to be either laid flat in an expanded state in the frame or folded up one by one to a standing state relative to the frame. The cover assembly also includes several functional components for supporting and protecting the multiple panels in the standing state. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented with references to the drawings, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, side, one end, upper, middle, lower, close, near, away, forward, reverse, longitudinal, transverse, clockwise and counterclockwise have been used for convenience purposes only and are not intended to imply any particular fixed direction. Instead, they are used to reflect relative locations and/or directions between various portions of an object. These terms are only used to distinguish the components from each other for better understanding, rather than defining any directional or sequential limitations.

Typically, a vehicle carriage or car's open trunk has two side frames in length direction. A cover assembly, including multiple cover panels hinge-coupled together, can be provided to cover the carriage by laying each cover panel flat to make the cover assembly in an expanded state. Alternatively, at least some cover panels of the cover assembly can be moveable and folded upward one by one into a standing state relative to the frame and set the carriage open, while one cover panel, which may be relatively narrower, near the front end of the carriage may be fixedly coupled to two side frames. This piece of panel may be considered to be an end portion of the carriage frame and it is hinge-coupled to a last one of multiple panels folded in the standing state. The multiple panels folded in the standing state also may be set to, at least partially, rest on to the flat end portion of the frame.

Figure 2A:
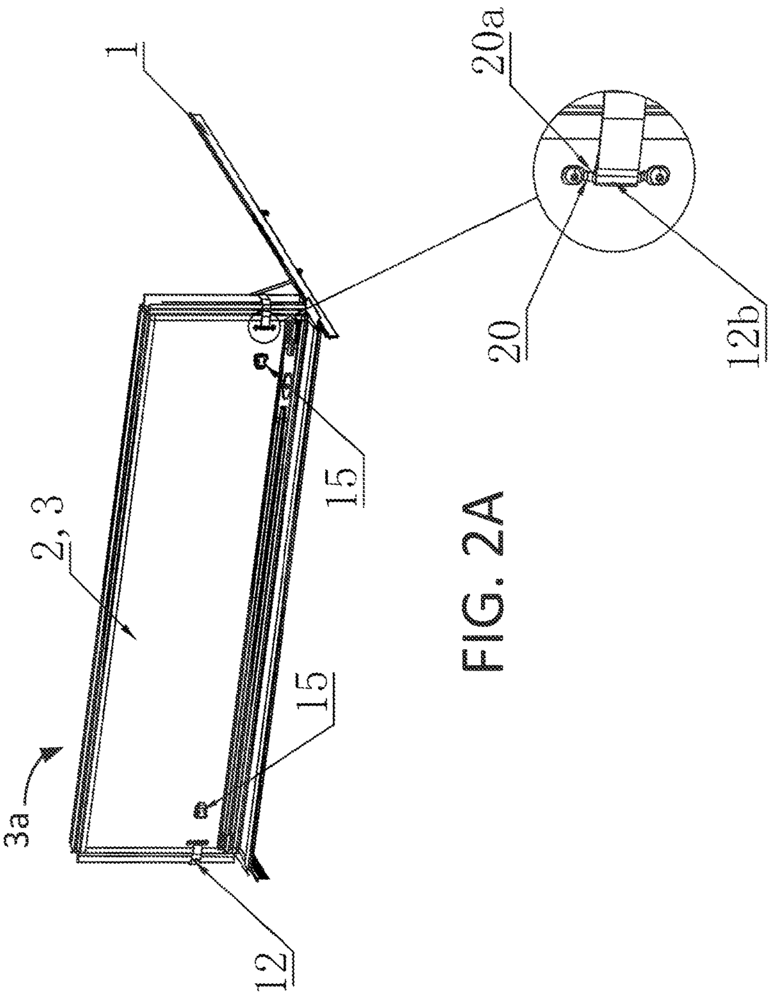
FIG. 2A and FIG. 2B show (A) a perspective view and (B) a side view of the multiple panels in the standing state of FIG. 1 with a binding component for binding the multiple panels together and a protective component for preventing the folded panels to be directly touched with the frame according to some embodiments of the present invention.
Figure 2B:
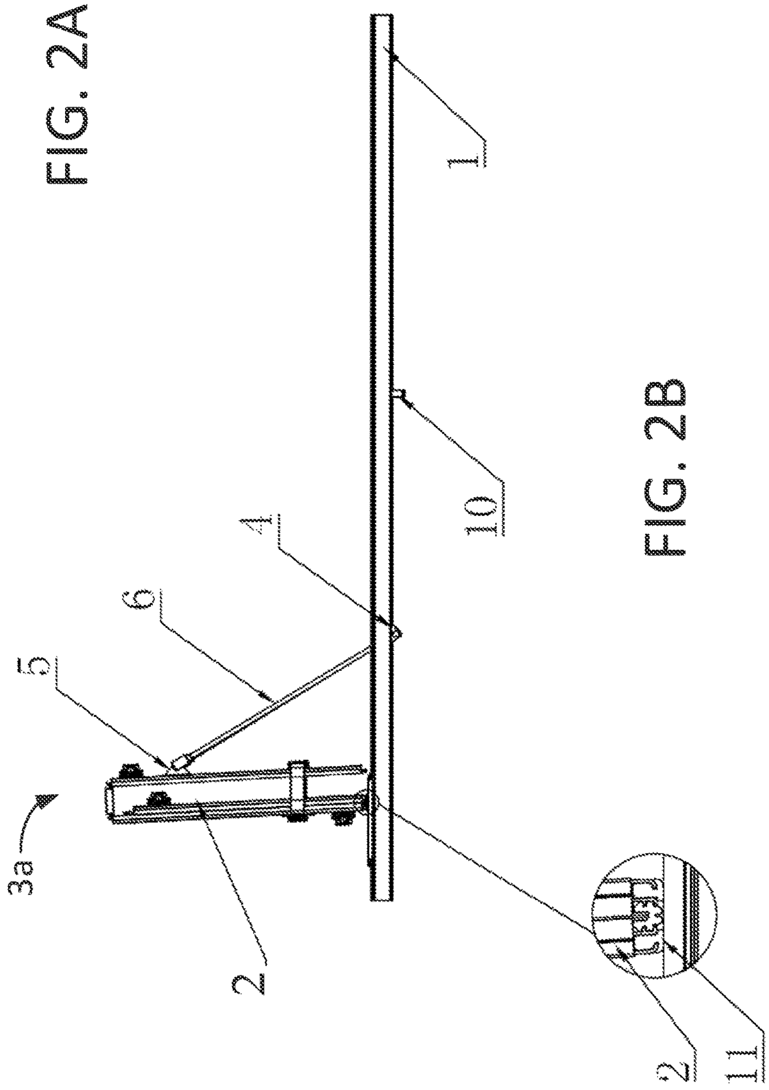
Figure 5A:
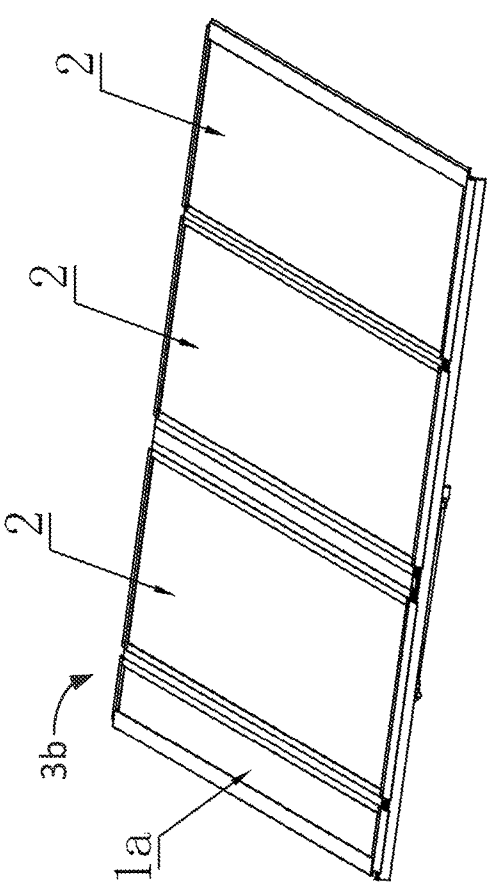
FIG. 5A, FIG. 5B, and FIG. 5C show (A) a perspective top view of cover assembly in the expanded state, (B) a perspective bottom view of the cover assembly in the expanded state, and (C) a bottom view of the cover assembly according to some embodiments of the present invention.
Figure 5C:
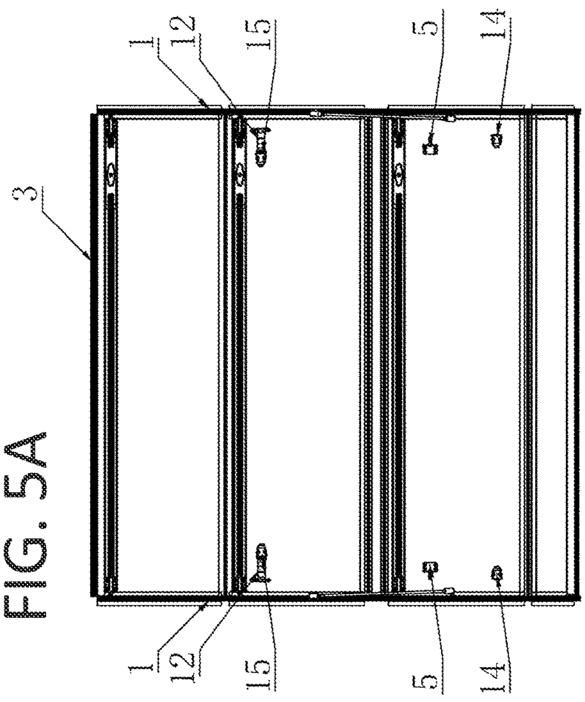
Figure 5B:
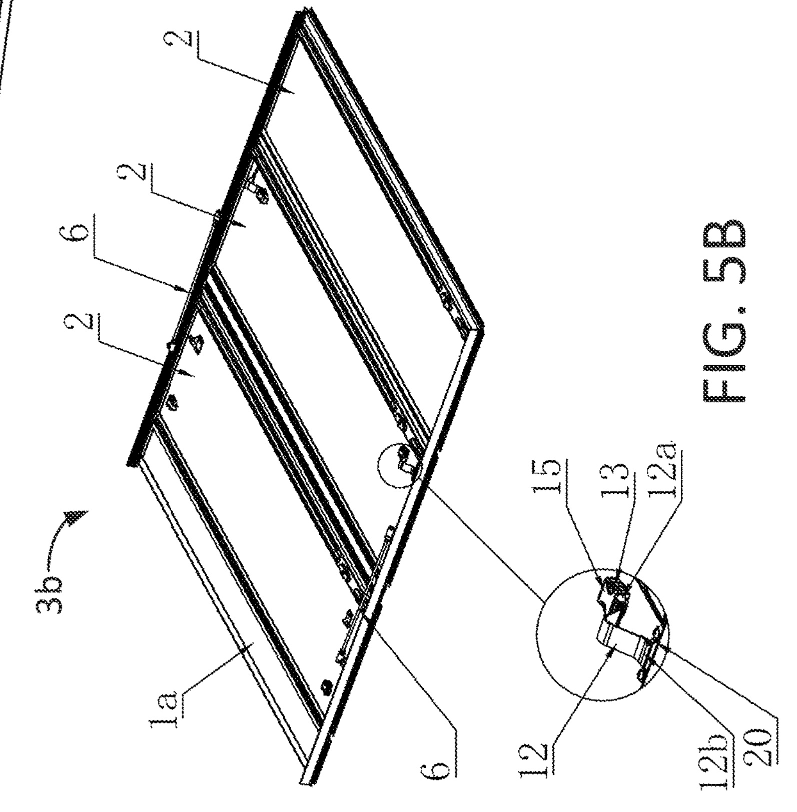

FIG. 1 is a perspective view of multiple panels folded to a standing state maintained by a supportive component according to an embodiment of the present invention. FIG. 2A and FIG. 2B also show (A) a perspective view and (B) a side view of the multiple panels in the standing state of FIG. 1 with a binding component for binding the multiple panels together and a protective component for preventing the folded panels to be directly touched with the frame according to some embodiments of the present invention. FIG. 5A, FIG. 5B, and FIG. 5C also show (A) a perspective top view of cover assembly in the expanded state, (B) a perspective bottom view of the cover assembly in the expanded state, and (C) a bottom view of the cover assembly in the expanded state according to some embodiments of the present invention. These diagrams are merely examples, which should not unduly limit the scope of the claims. One of ordinary skill in the art would recognize many variations, alternatives, and modifications. These figures show that a cover assembly with multiple cover panels being mutually hinge-coupled can be properly configured to be a retractable cover assembly from the expanded state to a standing state and properly maintained in the standing state supported and protected by some supportive and protective components.

In the perspective view of FIG. 1, the cover assembly 3 is made of individual panels 2 attached to a frame 1 while each neighboring panels are coupled by a hinge component which allows each of them be folded one by one to make then stand upright in a standing state 3*a* relative to the frame 1. Also as shown in FIG. 5A, the same hinge component also allows each of them be laid flat in the frame 1 to make the cover assembly 3 in an expanded state 3*b*.

In an embodiment, the said cover assembly 3 can be continuously maintained in the standing position state 3*b* through a supportive component. The supportive component is a structure constructed by multiple members. FIG. 1 shows an example, that the supportive component includes a first base plate 4 disposed on the frame 1 and a second base plate 5 disposed on one at least one of the multiple panels 2. The supportive component also includes a rod member 6 which has a length from a first end segment 61 to a second end segment. The rod member 6 is made by a hard strong material, optionally by metal material or hard plastic material, to be able to withstand pulling or pushing forces due to the weight of the multiple panels. The first end segment 61 is coupled to the first base plate 4 on the frame 1 and the second end segment 62 is coupled to the second base plate 5 on one panel 2. The length of the rod member 6 can be properly chosen such as the multiple panels folded in the standing state 3*a* can be maintained to stand upright with the rod member 6 to support in a tilted angle. Optionally, the first base plate 4 is made to be movable along the frame to help adapting the length of the rod member 6. As shown in FIG. 1, the supportive component can be set to both sides of the cover assembly. In another embodiment, the supportive component also includes a hook member 10 fixed to the frame 1. The hook member 10 provides a storage mechanism from the rod member 6 when the cover assembly 3 is retracted by unfolding the multiple panels 2 and laying them flat to the expanded state 3*b* in the frame 1. The second end segment 62 is configured to be relieved from the second base plate 5 and roll back to rest in the hook member 10. FIG. 5B shows that two rod members 6 on both side frames are rested (via the hook member) along the frame.

In another embodiment, FIG. 1 also shows that the multiple panels folded and stood upright in the standing state 3*b* are supported by a binding component 12. The binding component 12 may be provided as a strap member made by soft elastic material. The strap member 12 can wrap, from one panel plane at the back (not visible), across edges of multiple folded panels to bind to a binding seat 14 fixed to the panel plane at the front (visible) to securely bind them together when they are in the standing state 3*a*. As shown in FIG. 1, the binding component can be set at both sides of the cover assembly. In another embodiment, the binding strap member 6 can be relieved from the binding seat 14 to allow the unfolding of the multiple panels to set the cover assembly 3 back to the expanded state 3*b*. FIG. 5B shows the strap member 12 can be coupled to a buckle seat 15 disposed on the same panel 2 that has a fixing base 20 to fix the strap member 12. In particular, the strap member 12 has a fixing end 12*b* and a binding end 12*a*. The fixing end 12*b* is fixed to the fixing base 20 and the binding end 12*a* is coupled to a buckle 13. The buckle 13 now can be snaped in the buckle seat 15.

FIG. 2A and FIG. 2B show (A) a perspective view and (B) a side view of the multiple panels in the standing state of FIG. 1 with a binding component for binding the multiple panels together and a protective component for preventing the folded panels to be directly touched with the frame according to some embodiments of the present invention. These diagrams are merely examples, which should not unduly limit the scope of the claims. One of ordinary skill in the art would recognize many variations, alternatives, and modifications. In the embodiment, as shown in FIG. 2A, the binding strap member 12 is fixed to one back panel plane facing opposite direction versus another front panel plane to which it couples to a binding seat 14 shown in FIG. 1. An enlarged view shows that the fixing base 20 is screw mounted to the back panel plane. The fixing base 20 includes a strap groove 20*a* to allow the strap member 12 to be fixed there. On the same back panel plane, two buckle seats 15 are disposed. When the cover assembly 3 is about to unfold the panels 2, the binding strap member 12 can be relieved from the binding buckle seat 14 (see FIG. 1) and rolled backwards to snap into the buckle seat 15.

FIG. 2B also shows, from the side view, three panels 2 are folded to the standing state 3*a* when a first, second, and third panel are sequentially folded up with the first panel (with shorter width) being located in the center, the second panel with one plane facing back (left side) being coupled closely to the first panel, and the third panel with one plane facing front (right side) being coupled to the second panel with a larger separation. FIG. 2B further shows that a protective component 11 is included at the end of the cover panel 2 to provide a protective buffer between the hinged panels 2 and the frame 1. Additionally, the protective component 11, e.g., a rubber strip, can provide an anti-slip function for supporting better standing stability of the cover assembly 3. The protective component 11 provides some frictional force, enabling the cover assembly 3 to stand upright (without tilting) on the frame 1. More details about the protective component and its structure can be founded in the specification and drawings.

Figure 3B:
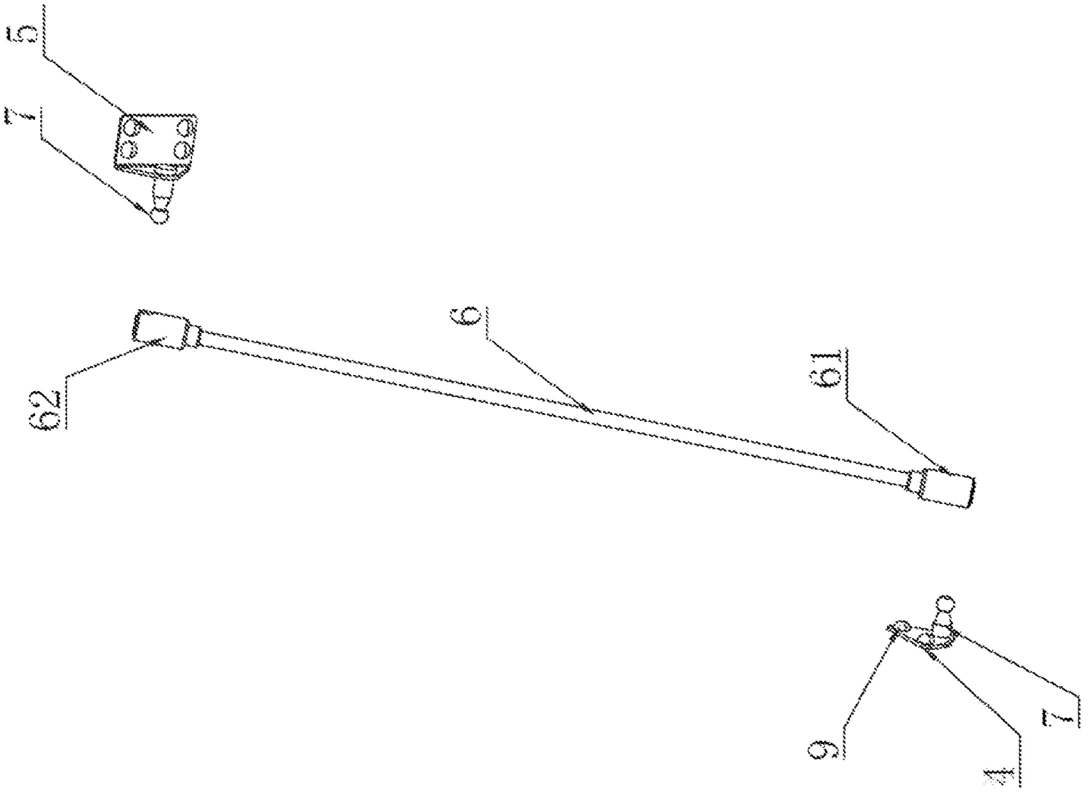
FIG. 3A and FIG. 3B show (A) a perspective view and (B) a partial disassembled view of the supportive component provided as a rod member according to some embodiments of the present invention.
Figure 3A:
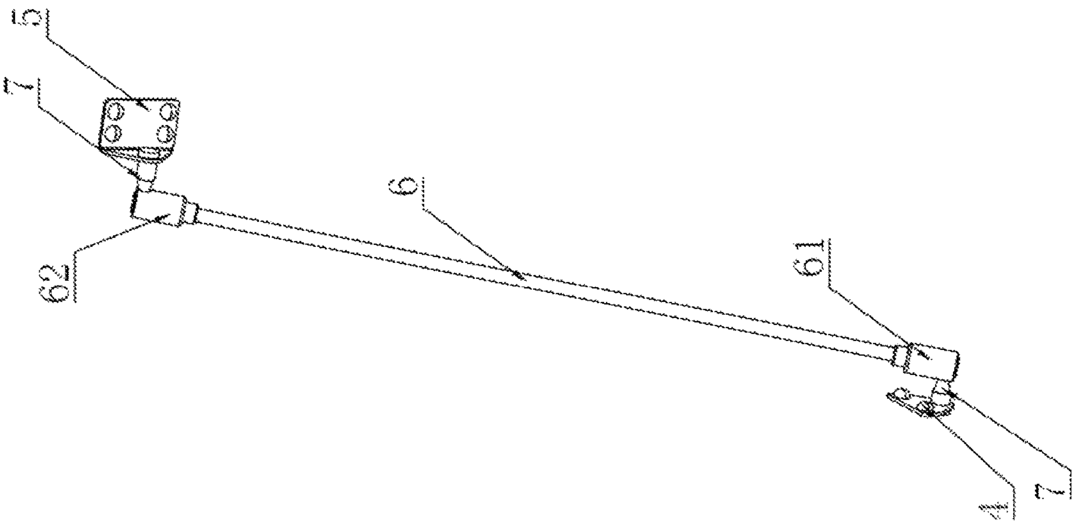
Figure 4B:
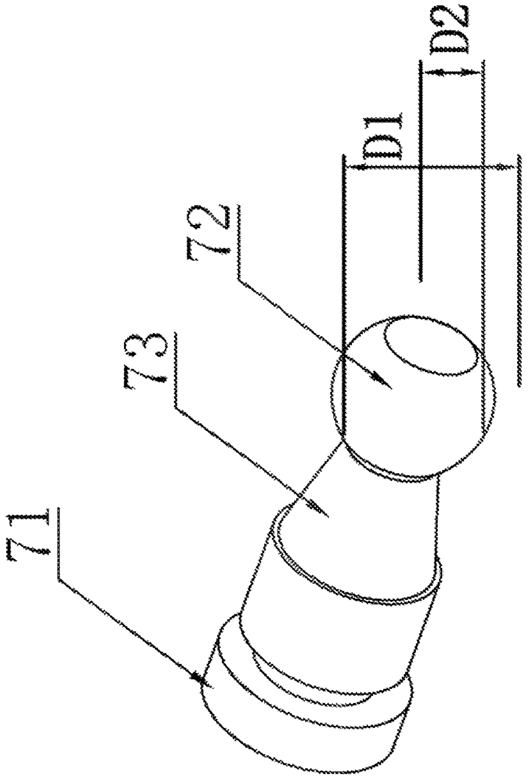
FIG. 4A and FIG. 4B show (A) a perspective view of a side-connector being coupled to the rod member of FIG. 3 and (B) the side-connector itself according to some embodiments of the present invention.
Figure 4A:
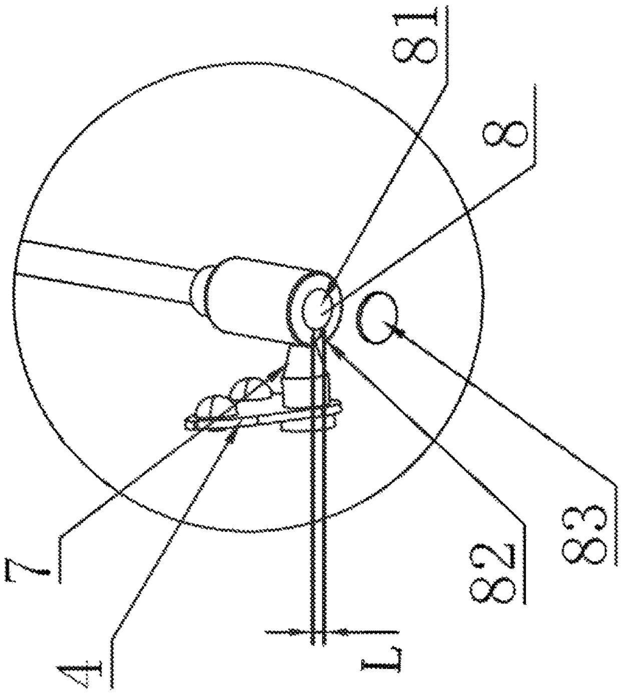

FIG. 3A and FIG. 3B show (A) a perspective view and (B) a partial disassembled view of the supportive component provided as a rod member according to some embodiments of the present invention. FIG. 4A and FIG. 4B show (A) a perspective view of a side-connector being coupled to the rod member of FIG. 3 and (B) the side-connector itself according to some embodiments of the present invention. These diagrams are merely examples, which should not unduly limit the scope of the claims. One of ordinary skill in the art would recognize many variations, alternatives, and modifications. In an embodiment, these figures show one of coupling schemes for the supportive component to provide mechanical support to maintain the multiple panels folded in the standing state relative to the frame. FIG. 4A, in an enlarged view, shows the first end segment 61 of the rod member 6 have a receiving cavity 8. The first base plate 4 has a side-connector 7 configured to be inserted into the receiving cavity 8, allowing the first end segment 61 to form a detachable connection with the first base plate 4. In an embodiment, the second end segment 62 of the rod member 6 has a same structure as the first end segment. The second base plate 5 also is equipped with a side-connector 7 configured to be inserted into the receiving cavity 8 of the second end segment 62 to form a detachable connection with the second base plate 5.

FIG. 4B, specifically, shows an example that the side-connector 7 includes a base segment 71 that connects to the first base plate 4 or second base plate 5, a ball-head segment 72 that is inserted into the receiving cavity 8, and a tapered segment 73 that intervenes between the base segment 71 and the ball-head segment 72. The base segment 71 serves a structural support role; the ball-head segment 72 enables universal rotational connection between the side-connector 7 and the first base plate 4 or second base plate 5; the tapered segment 73 structurally achieves a detachable connection mechanism.

In a specific embodiment, as shown in FIG. 4A, the receiving cavity 8 of the end segment has an end opening 81 that is configured to allow entry/exit of the ball-head segment 72. A relief opening 82 is provided on the sidewall of the receiving cavity 8 and is located opposite to the tapered segment 73. Additionally, there is an end cap 83, which can be placed over the end opening 81. Furthermore, the lateral dimension L of the relief opening 82 is smaller than the diameter D1 of the ball-head segment 72 but larger than the smallest diameter D2 of the tapered segment 73. In specific operation of the supportive component, the ball-head segment 72 is aligned with the end opening 81, while also aligning the tapered segment 73 with the relief opening 82. This enables the side-connector 7 to be inserted into the receiving cavity 8. After insertion, in order to prevent the side-connector 7 from detaching from the receiving cavity 8, the end cap 83 needs to be closed and cover the end opening 81, thereby achieving an anti-detachment effect.

Referring to FIG. 3A, the side-connectors 7 on both end segments of the supportive rod member 6 are each connected to the corresponding receiving cavities 8 in the first base plate 4 and second base plate 5. This allows the rod member 6 to establish a firmly (through detachable) couplings to the base plates which support the multiple panels 2 at both ends, enabling the cover assembly 3 to continuously remain in the standing state 3*a*. At least one of the two end segments of the supportive rod member 6 is in a detached (unconnected) state, see FIG. 3B, to eliminate interference between the cover panels 2, making it easy to achieve a flat-laying operation. Thus, the cover assembly 3 can continuously remain in the expanded state 3*b*. As mentioned in FIG. 1, the first base plate 4 is mounted to the frame 1 by screws 9. The second base plate 5 may include a bottom plate and an installation plate that is vertically arranged relative to the bottom plate. The bottom plate of the second base plate 5 is fixed to the panel 2 by screws 9, and the side-connector 7 of the second base plate 5 is fixed to the installation plate. Optionally, the first base plate 4 has a movable design so that it can be flexibly set to a different position along the frame length depending on applications.

In implementations of the above coupling scheme, influenced by internal and external structural environments, in order to maintain functionality with the simplest structural setup, a specific adopted approach may be provided as following: The side-connector 7 on the first base plate 4 is protruding from the outside (of the carriage) to the inside, and the side-connector 7 on the second base plate 5 is protruding from the inside to the outside. By adopting this configuration, on one hand, it ensures that the supportive rod member 6 remains within the same plane dimension when in use, avoiding pressure from the third dimension, thus improving the stability of the supportive component when providing support to the cover assembly 3 in the standing state 3*b* and reducing the chances of bending, deformation, and damage. On the other hand, it allows for the shortest path to be selected between the first base plate 4 and the second base plate 5, simplifying overall structure of the cover assembly.

As shown in FIG. 1, FIG. 2A, and FIG. 2B, at least one of the multiple panels of the cover assembly 3 includes a fixed binding strap member 12 and another of the multiple panels includes a binding seat 14. The strap member 12 has a binding end 12*a* and a fixed end 12*b*. The fixed end 12*b* is connected to one of the cover panel 2, while the binding end 12*a* is able to move between the various cover panels 2. The user of the cover assembly 3 first can fold the panels of the cover assembly 3 from the flat expanded state (3*a*) one by one to the standing position state (3*b*). At this time, the user can operate the binding strap 12 to make the binding end 12*a* to couple with the binding seat 14, thereby binding the multiple panels 2 together (in the standing state). Preferably, the binding strap member 12 and the binding seat 14 are located on the two outermost cover panels 2 (see FIG. 2B). The middle cover panel are positioned between the two outer cover panels and do not require additional fixing. This arrangement allows the entire cover assembly 3 to be bundled and maintained in the standing position state 3*b*. The strap member 12 is made of a soft, elastic material, allowing for twisting, winding, and changing positions. Preferably, the strap member 12 can be made from materials such as nylon, polyamide, polyester, or rubber.

For example, using the cover panel 2 where the fixed end 12*b* of the strap member 12 is located as a reference, users can selectively fold the required number of cover panels 2 and store them in an upright position, then correspondingly connect the binding end 12*a* to bundle the associated cover panels 2 together. In other words, it is possible to achieve the effect where one or more of the cover panels 2 remain laid flat, while rest one or more panels can be bundled and kept in an upright position, offering greater functionality.

Figure 6B:
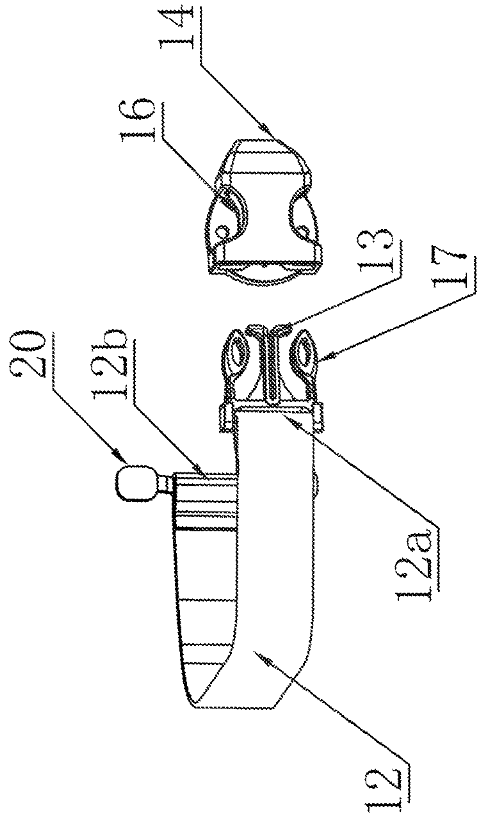
FIG. 6A, FIG. 6B, and FIG. 6C show (A) a perspective view of a strap member with a buckle inserted into a first buckle seat, (B) unbuckled from the buckle seat, and (C) to be inserted to a second buckle seat according to some embodiments of the present invention.
Figure 6A:
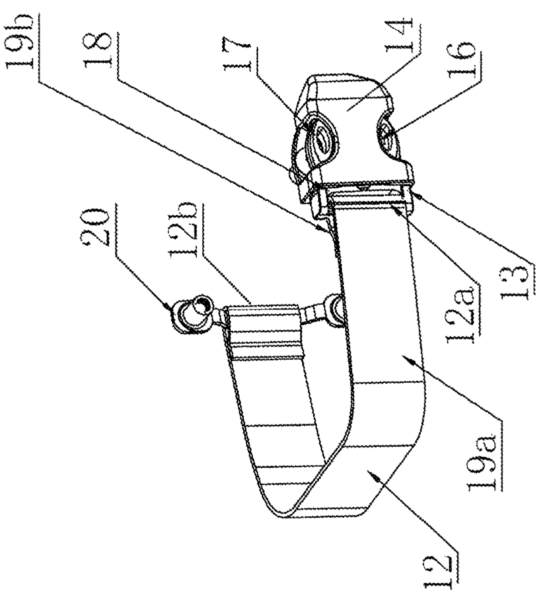
Figure 6C:
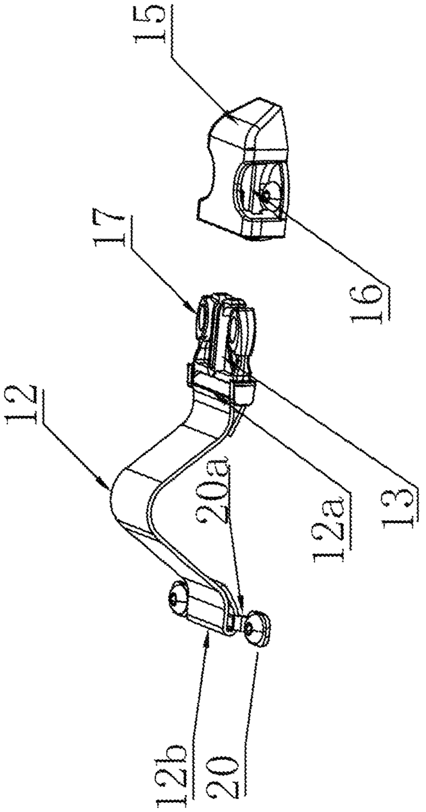

FIG. 6A, FIG. 6B, and FIG. 6C show (A) a perspective view of a strap member with a buckle inserted into a first buckle seat, (B) unbuckled from the buckle seat, and (C) to be inserted to a second buckle seat according to some embodiments of the present invention. These diagrams are merely examples, which should not unduly limit the scope of the claims. One of ordinary skill in the art would recognize many variations, alternatives, and modifications. As shown, the binding end 12*a* of the strap member 12 is equipped with a buckle 13, and the binding seat on another panel is a restraint buckle seat 14. The buckle 13 can be fastened into the restraint buckle seat 14. Through the cooperation of the buckle 13 and the restraint buckle seat 14, a quick-release and quick-assembly effect can be achieved. Furthermore, the side wall of the restraint buckle seat 14 is designed with an anti-detachment groove 16, which is offset from the snapping-in direction of buckle 13. The side wall of the buckle 13 is equipped with an elastic clamp block 17. The elastic clamp block 17 can be locked into the anti-detachment groove 16, allowing the buckle 13 and the restraint buckle seat 14 to form an anti-detachment fit (see FIG. 6A and FIG. 6B). This enables it to withstand greater weight and pressure, significantly increasing reliability during use and allowing the cover assembly 3 to maintain its upright standing state (3*b*) continuously and stably.

Differences in vehicle types, or variations in the thickness of the cover unit components 2, or the number of cover panels in the standing state, will all affect the thickness dimensions of the cover assembly 3 when it is in the upright standing state (3*b*). Therefore, using a uniform length for the strap member 12 would directly impact the effectiveness of the bundling. FIG. 6A shows that the end of the buckle 13 includes an adjustment groove 18. At least part of the strap member 12 can be passed through this adjustment groove 18, dividing the strap member 12 into a working section 19*a* and a non-working section 19*b*. By adjusting the length of the strap member 12 that passes through the adjustment groove 18, one can control the length of the working section 19*a*. This provides adjustability and ensures that, without having to replace the entire strap member 12, the cover assembly 3 can always be effectively bundled.

To achieve a fixed connection between the fixing end 12*b* of the strap member 12 and one of the cover panels 2, a fixing base 20 is provided and fixedly mounted on the cover panel plane where the strap member 12 is located. The fixing base 20 protrudes outward to form a strap groove 20*a*, and the fixing end 12*b* of the strap member 12 is threaded through this strap groove 20*a*. After the fixing end 12*b* passes through the strap groove 20*a*, it can be completely sealed in various ways, such as adhesive bonding, stitching, heat sealing, etc. The specific method used is not particularly limited here.

In the same cover panel 2 where the strap member 12 is fixed to a fixing base 20, a second buckle seat 15 is disposed. The buckle 13 of the strap member 12 can be snapped into the second buckle seat 15 (as shown in FIG. 5C and FIG. 6C). In other words, since the strap member 12 and the second buckle seat 15 are both on the same cover panel 2, the distance between the strap member 12 and the second buckle seat 15 does not change under any condition of the cover assembly 3. Therefore, users can easily match the buckle 13 of the strap member 12 with the second buckle seat 15 and snap them together to achieve the purpose of storing the strap member 12.

According to the usage position and functional requirements, the strap member 12 and the restraint (first) buckle seat 14 are aligned in a straight line longitudinally (from one panel to another panel). The strap member 12 and the storage (second) buckle seat 15 are also aligned in a straight line horizontally (within the same panel). This allows the strap member 12 to cooperate smoothly with either the restraint buckle seat 14 or the storage buckle seat 15 without the need for winding, maintaining a relatively smooth orientation.

In some embodiments, the present disclosure also provides retractable cover assembly with protective anti-scratch and anti-collision features. The cover assembly 3 includes several cover panels 2 mounted in a frame 1. The cover assembly 3 has two position states relative to the frame 1: a flat expanded state 3*b* (see FIG. 5A) and a standing state 3*a*. It also includes an anti-collision protective component 11 (see FIG. 2B). When the cover assembly 3 is in the standing state 3*a*, the protective component 11 is positioned between the folded cover panels 2 and the frame 1. Therefore, the protective component 11 serves as a transitional or buffer element between the cover panels 2 and the frame 1, preventing the cover assembly 3 in the standing state 3*a* from directly contacting the frame 1. This offers good anti-collision and anti-scratch protection for both the frame 1 and the cover panel 2. Additionally, when standing, the protective component 3 provides a certain amount of frictional contact, allowing the cover assembly 3 to stand upright on the frame 1.

When the cover assembly 3 is in the flat expanded state 3*b*, the protective component 11 is located between neighboring cover panels 2. Therefore, the protective component 11 may serve as a transitional element between two neighboring panels that are coupled each other by a hinge component 25, preventing them from coming into direct contact with each other when in the flat expanded state 3*b*. This provides good anti-collision and anti-scratch protection for the cover panels 2. At the same time, the protective component 3 can also, together with the hinge component 25, fill the gaps between any two neighboring panels 2, providing effective dust sealing.

Figure 7B:
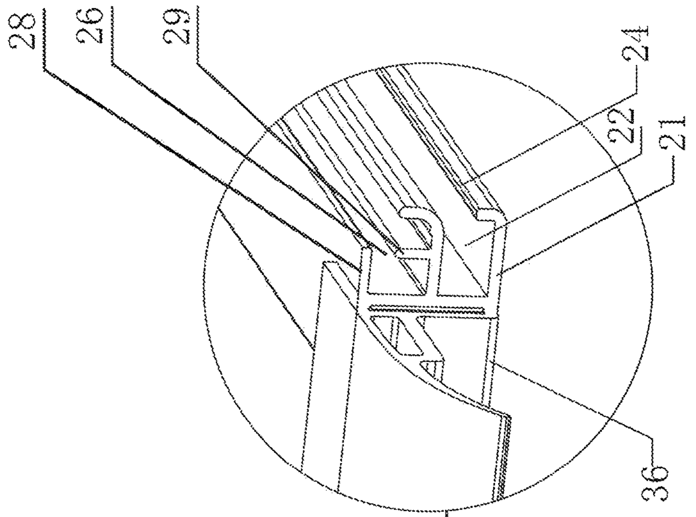
FIG. 7A, FIG. 7B, and FIG. 7C show (A) a perspective view of a cover panel, (B) an enlarged view of a coupling edge of the panel with a connection fixture, and (C) a perspective view of a protective component in stripe shape according to some embodiments of the present invention.
Figure 7A:
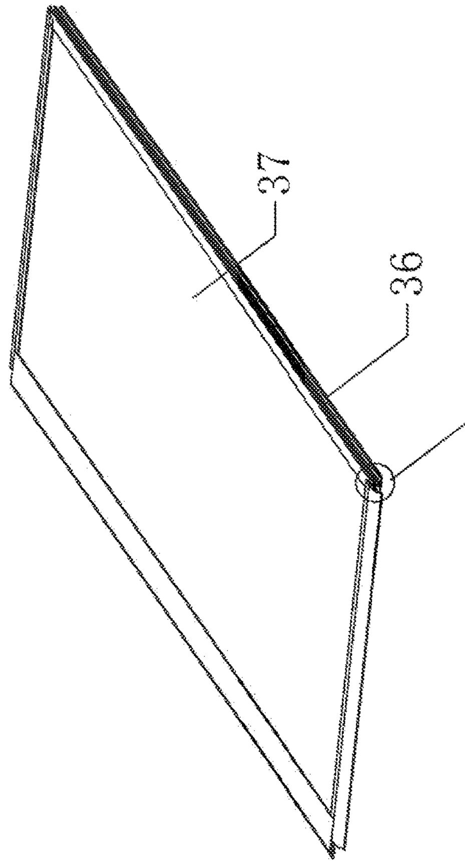
Figure 7C:
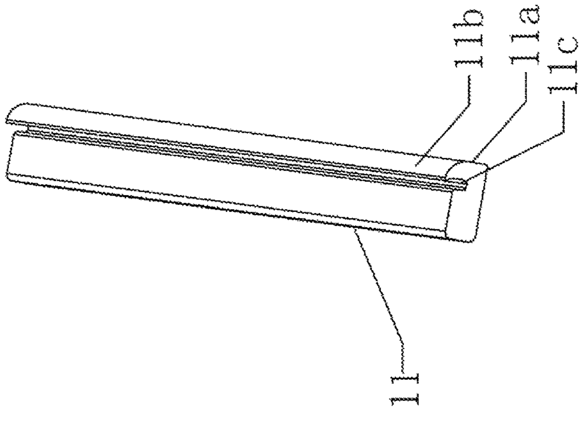
Figure 8B:
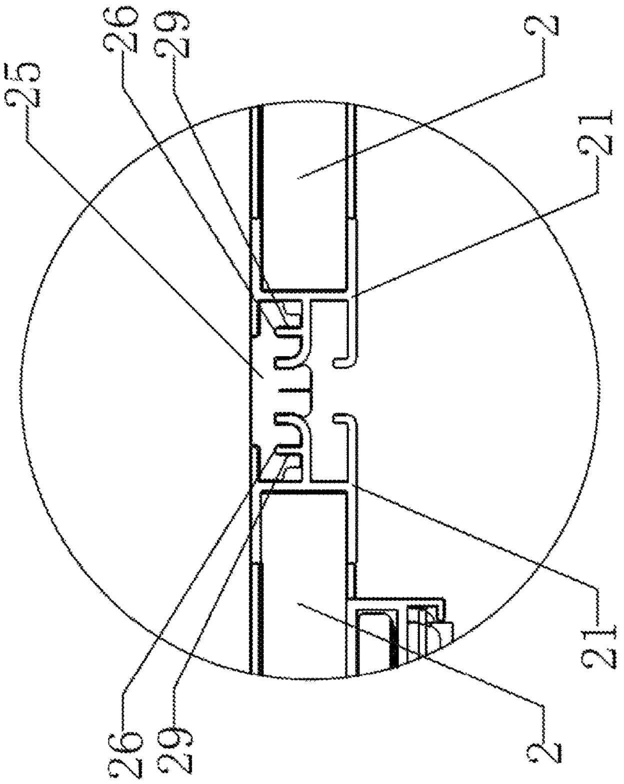
FIG. 8A and FIG. 8B show a side view of two panels coupled via a hinge component in a connection fixture with a pair of protective components (A) being inserted in and (B) being removed out according to an embodiment of the present invention.
Figure 8A:
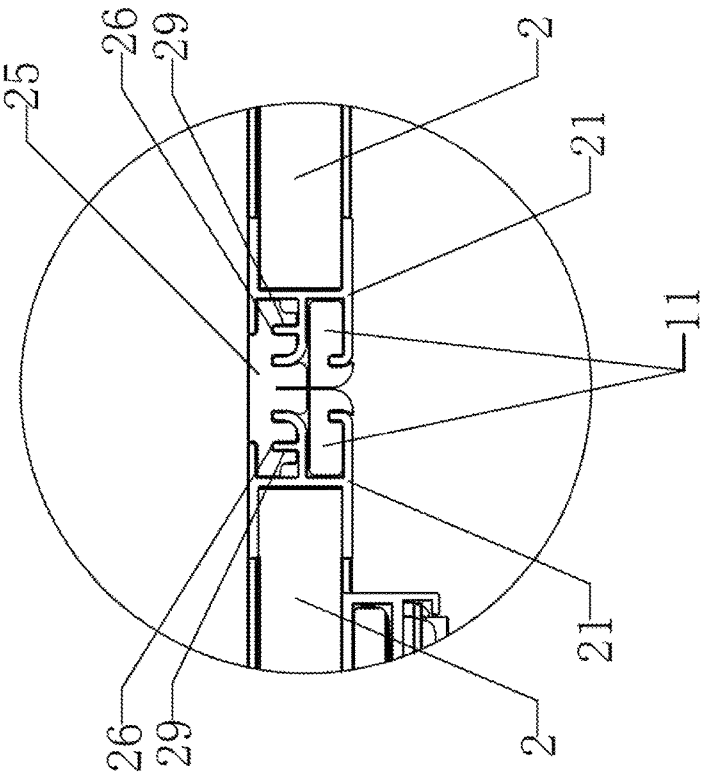
Figure 9A:
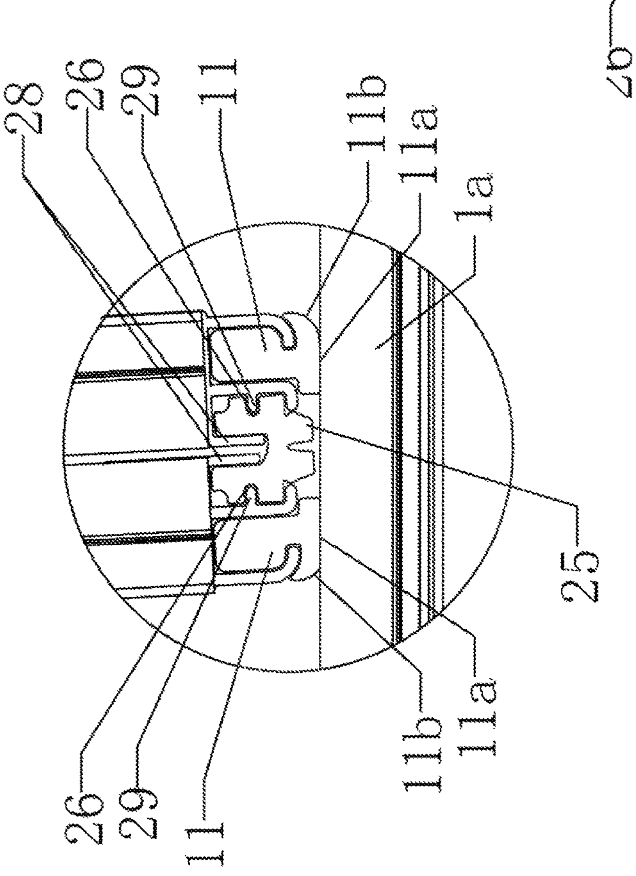
FIG. 9A and FIG. 9B show a side view of the protective components configured to have flat surfaces rested on (A) a flat surface or (B) a positioning groove in an end portion of the frame according to some embodiments of the present invention.
Figure 9B:
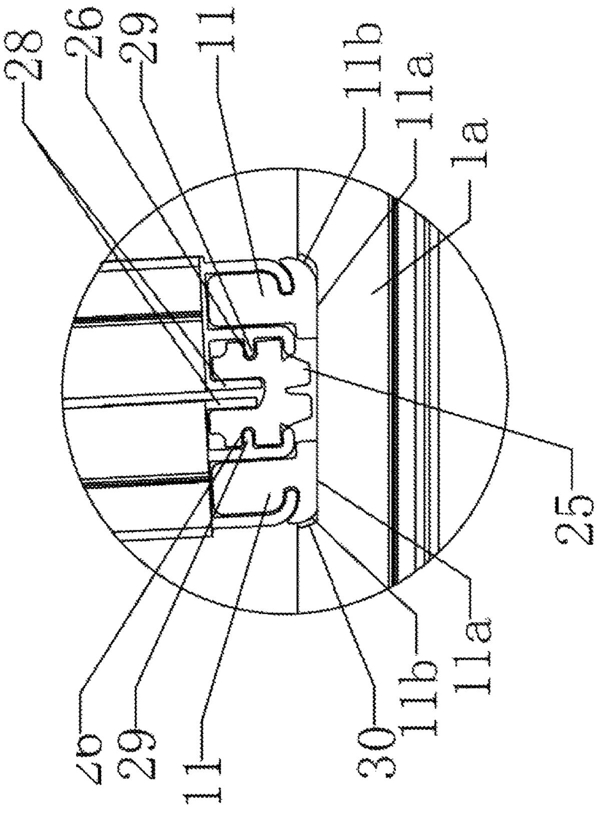

FIG. 7A, FIG. 7B, and FIG. 7C show (A) a perspective view of a cover panel, (B) an enlarged view of a coupling edge of the panel with a connection fixture, and (C) a perspective view of a protective component in stripe shape according to some embodiments of the present invention. FIG. 8A and FIG. 8B show a side view of two panels coupled via a hinge component in a connection fixture with a pair of protective components (A) being inserted in and (B) being removed out according to an embodiment of the present invention. FIG. 9A and FIG. 9B show a side view of the protective components configured to have flat surfaces rested on (A) a flat surface or (B) a positioning groove in an end portion of the frame according to some embodiments of the present invention. These diagrams are merely examples, which should not unduly limit the scope of the claims. One of ordinary skill in the art would recognize many variations, alternatives, and modifications.

In some embodiments, as shown in FIG. 7A, the cover panel includes a rigid frame member 36, as well as a shield member 37 that covers the rigid frame member 36, to maintain the stability of the cover panel own form. The shield member 37 can be made of either hard or soft materials, and there are no specific restrictions. Preferably, it is made of hard plastic material, which can resist various impacts, is not easily damaged, and provides better protective effects. Preferably, the protective component 11 is made of one or more materials from rubber, soft plastic, and foam, possessing a certain ability for self-deformation and recovery.

Referring to FIG. 7B, an enlarged view of the corner structure of the rigid frame member 36 is shown. The rigid frame member 36 extends outward at least partially to form a connection fixture 21. An installing groove 22 is provided in the connection fixture 21. At least an in-groove part of the protective component 11 is configured to be inserted into the installing groove 22, and another portion, an out-groove part, extends out of the installing groove 22. The in-groove part of the protective component 11 that is inserted into the installing groove 22 provides support for installation and connection, while the out-groove part that extends outward is used for contact with the frame 1.

To prevent the protective component 11 from becoming loose relative to the installing groove 22, one side of the installing groove 22 is configured with an opening. One side of the connection fixture 21 is configured to be bent towards the opening to form a necking rib 24. A fitting groove 11*c* (see FIG. 7C) is provided on the protective component 11. The necking rib 24 is configured to be inserted into the fitting groove 11*c*, making the installation between the protective component 11 and the connection fixture 21 more secure and reliable. This ensures that the cover panel 2 will not become loose during the folding/unfolding process. FIG. 7C also shows that the protective component 11 has a portion located outside of the fitting groove 11*c* which becomes the out-groove part after the protective component 11 is inserted into the installing groove 22. The out-groove part also includes a flat surface 11*a* and an arc surface 11*b*.

As shown in FIG. 7B, the connection fixture 21 also includes a connecting groove 26 with a connection rib 29 set vertically relative to the frame plane and a shaping rib 28 set to be leveled with the frame plane. In an embodiment, two neighboring cover panels 2 are connected through a hinge component 25 inserted into two connecting grooves 2 associated with these two panels to achieve the quick folding and stacking of multiple cover panels as well as quick deployment for use. The hinge component 25, in the embodiment shown in FIG. 8A, is made of a soft strip-like material with a connecting groove 14. The connection rib 29 is inserted into the connecting groove 26 to connect two adjacent cover panels together. Even after repeated rotation and use, the soft strip-like material can still maintain good fatigue performance, thereby ensuring the reliability of the hinge effect. FIG. 8A also shows that a pair of protective components 11 are respectively inserted into the two installing grooves 21 associated with two connection fixtures for respective two neighboring cover panels 2. The flat surface of one out-groove part of a protective component installed for a panel on the left forms a contact with flat surface of another out-groove part of another protective component installed for a panel on the right. FIG. 8B shows that two panels being coupled by a hinge component 25 but no protective components are installed in the connection fixtures 21.

In a specific embodiment, the connection fixture 21 also includes a protruding shaping rib 28. When the two cover panels 2 are in flat expanded state, the two shaping ribs 28 are leveled with the shield member to make the hinge component 25 also in a flat shape. When the two cover panels 2 are folded in the standing state 3*a*, the soft strip-like material of the hinge component 25 bends flexibly to form a U-shaped groove. The two shaping ribs 28 are positioned into the U-shaped groove (see FIG. 9A and FIG. 9B). FIG. 9A also shows that two protective components 11 are inserted respectively in two installing grooves of the two connection fixtures associated to respective neighboring cover panels 2 folded in the standing state. The out-groove part of the protective component 11 plays a role as physical buffer between the panels and the frame, e.g., the flat surface 11*a* of the out-groove part is in contact with the surface of the end portion of the frame 1*a*. The soft material of the protective component 11 substantially reduces the potential of physical damage from direct collision or friction between the panels and the frame. For further reducing potential shift motion of the panels 2 on the flat surface of the frame 1*a*, FIG. 9B shows that a positioning trench 30 is formed at a proper location of the frame 1*a* so that the out-groove part of the protective component can be seat in with the arc surface 11*b* fitting with a curved side wall of the positioning trench 30. This provides enhanced security to protect the panels in the standing state.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A retractable carriage cover assembly comprising:

a frame;

multiple panels assembled in the frame with each panel being coupled by a hinge component to its neighboring panel to either be laid flat in an expanded state in the frame or folded up one by one to a standing state relative to the frame; and a supportive component coupled to both the frame and at least one of the multiple panels folded in the standing state to maintain the standing state;

wherein the supportive component further comprises a rod member of a length from a first end segment with a first receiving cavity and a second end segment with a second receiving cavity, and the first end segment comprises a relief opening.

2. The cover assembly of claim 1 wherein the supportive component comprises a first base plate fixed to the frame with a first side-connector protruding laterally from carriage outside inwards, the first side-connector comprising a base segment fixed to the first base plate, a tapered segment extended from the base segment, and a ball-head segment further extended from the tapered segment.

3. The cover assembly of claim 2 wherein the supportive component further comprises a second base plate fixed to the at least one of the multiple panels with a second side-connector protruding laterally from carriage inside outwards, the second side-connector comprising a base segment, a tapered segment, and a ball-head segment.

4. The cover assembly of claim 3 wherein the length being configured to have the first receiving cavity to secure the ball-head segment of the first side-connector in a detachable connection between the first end segment of the rod member and the frame and the second receiving cavity to secure the ball-segment of the second side-connector to form a detachable connection between the second end segment of the rod member and the at least one of the multiple panels such that the at least one of the multiple panels maintains the standing state.

5. The cover assembly of claim 4 wherein the first receiving cavity comprises an end opening to allow exit or entry of the ball-head segment of the first side-connector, the relief opening positioned relative to the tapered segment of the first side-connector, and an end cap to cover the end opening.

6. The cover assembly of claim 5 wherein the relief opening comprises a lateral dimension smaller than a diameter of the ball-head segment but larger than a smallest diameter of the tapered segment.

7. The cover assembly of claim 5 wherein the frame comprises a retracking hook configured to hold the first end segment of the rod member after the first end segment being detached from the first side-connector for the multiple panels being laid flat in the expanded state.

8. A retractable carriage cover assembly comprising:

a frame;

multiple panels assembled in the frame with each panel being coupled by a hinge component to its neighboring panel to either be laid flat in an expanded state in the frame or folded up one by one to a standing state relative to the frame;

a supportive component coupled to both the frame and at least one of the multiple panels folded in the standing state to maintain the standing state; and a binding component configured to bundle the multiple panels folded together in the standing state;

wherein the binding component comprises a fixing base fixed at one of the multiple panels, a strap member with a fixing end coupled via a strap groove to the fixing base and a binding end coupled via an adjusting groove to a buckle, and a first buckle seat disposed at another one of the multiple panels.

9. The cover assembly of claim 8 wherein the first buckle seat is configured to allow the buckle to snap in and be restrained when the cover assembly in the standing state.

10. The cover assembly of claim 9 wherein the first buckle seat comprises an anti-detachment groove and the buckle comprises an elastic clamp block, the anti-detachment groove being offset from a snapping-in direction of the buckle to lock the elastic clamp block in the first buckle seat.

11. The cover assembly of claim 10 wherein the strap member comprises a soft elastic material configured to adjust a working length through the adjusting groove such that the strap member with the working length suited for wrapping across edges of the multiple panels folded together in the standing state to snap the buckle into the first buckle seat.

12. The cover assembly of claim 11 wherein the binding component further comprises a second buckle seat disposed at the same one of the multiple panels as that with the fixing base, the second buckle seat being configured to allow the buckle to snap in and be restrained when the cover assembly in the expanded state.

13. The cover assembly of claim 8 wherein the supportive component comprises a rod seat fixed to a mounting base that is disposed to the at least one of the multiple panels and a base plate mounted on the frame.

14. The cover assembly of claim 13 wherein the supportive component further comprises a rod member of a length from a first end segment to a second end segment, the first end segment being configured to be inserted to the rod seat and the second end segment being coupled to the base plate that is fixed to a position on the frame to accommodate the length such that the multiple panels are maintained in the standing state.

15. A retractable carriage cover assembly comprising:

a frame with a flat end portion;

multiple panels assembled in the frame with each panel being coupled by a hinge component to its neighboring panel to either be laid flat in an expanded state in the frame or folded up one by one to a standing state rested on the flat end portion;

a supportive component coupled to both the frame and at least one of the multiple panels folded in the standing state to maintain the standing state; and a pair of protective components disposed next to the hinge component to form a protection buffer between the multiple panels folded in the standing state and the flat end portion of the frame;

wherein each of the multiple panels comprises a rigid frame member in a rectangular shape, the rigid frame member of each panel comprises a connection fixture extended outward, the connection fixture comprises an installing groove with a necking rib and a connecting groove with a connection rib being set vertically relative to the shield member and a shaping rib being leveled with the shield member.

16. The cover assembly of claim 15 wherein each of the multiple panels comprises a shield member of the rectangular shape placed over the rigid frame member.

17. The cover assembly of claim 15 wherein each of the pair of protective components comprises a material made from one of rubber, soft plastic, and foam in a stripe shape comprising an in-groove part and an out-groove part connected by a fitting groove, the in-groove part being inserted in the installing groove with the necking rib being fitted the fitting groove.

18. The cover assembly of claim 17 wherein the out-groove part of each of the pair of protective components comprising a flat surface configured to touch the flat end portion of the frame for protecting at least two panels folded in the standing state or for touching against another flat surface corresponding to the another of the pair of protective components inserted in an installing groove of a connection fixture associated with a neighboring panel when both panels are in the expanded state.

19. The cover assembly of claim 15 wherein the hinge component comprises a rubber material in a stripe shape configured with two connection parts be respectively inserted in two connecting grooves associated with respective two connection fixtures of two neighboring panels, the two connection parts being partially fixed by respective connection ribs and deformably restrained by the two shaping ribs.

* * * * *